United States Patent
Hwang et al.

(10) Patent No.: US 10,020,971 B2
(45) Date of Patent: Jul. 10, 2018

(54) METHOD AND USER EQUIPMENT FOR TRANSRECEIVING TDD

(71) Applicant: LG ELECTRONICS INC., Seoul (KR)

(72) Inventors: Daesung Hwang, Seoul (KR); Yunjung Yi, Seoul (KR); Hakseong Kim, Seoul (KR); Seungmin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 12 days.

(21) Appl. No.: 14/434,373

(22) PCT Filed: Sep. 17, 2013

(86) PCT No.: PCT/KR2013/008387
§ 371 (c)(1),
(2) Date: Apr. 8, 2015

(87) PCT Pub. No.: WO2014/069788
PCT Pub. Date: May 8, 2014

(65) Prior Publication Data
US 2015/0295743 A1    Oct. 15, 2015

Related U.S. Application Data

(60) Provisional application No. 61/836,107, filed on Jun. 17, 2013, provisional application No. 61/719,494, filed on Oct. 29, 2012.

(51) Int. Cl.
*H04L 27/26* (2006.01)
*H04W 48/12* (2009.01)
(Continued)

(52) U.S. Cl.
CPC ........ *H04L 27/2607* (2013.01); *H04L 5/0028* (2013.01); *H04L 5/0092* (2013.01);
(Continued)

(58) Field of Classification Search
CPC ............... H04W 48/12; H04W 72/042; H04W 72/0446; H04W 88/02; H04W 24/02;
(Continued)

(56) References Cited

U.S. PATENT DOCUMENTS

2008/0225802 A1* 9/2008 Sun ............. H04W 56/003
370/336
2009/0125363 A1* 5/2009 Frederiksen ...... H04W 72/1263
370/345

(Continued)

FOREIGN PATENT DOCUMENTS

CN    101179328    5/2008
CN    102710387    10/2012
(Continued)

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 8)", Mar. 2008, 3GPP, 3GPP TS 36.211 V8.2.0 (Year: 2008).*
(Continued)

*Primary Examiner* — Paul H Masur
*Assistant Examiner* — Michael K Phillips
(74) *Attorney, Agent, or Firm* — Lee, Hong, Degerman, Kang & Waimey

(57) ABSTRACT

According to one embodiment of the present invention, suggested is a method for user equipment transceiving a time division duplex. The method comprises the steps of: receiving from a cell first information on a downlink (DL)-uplink (UL) subframe configuration according to the TDD; receiving second information on whether to apply a third cyclic prefix (CP), which has a reduced length compared to a first CP and a second CP; and depending on the first information, determining whether to apply the third CP to
(Continued)

the downlink subframe and the uplink subframe according to the second information.

16 Claims, 20 Drawing Sheets

(51) Int. Cl.
*H04L 5/14* (2006.01)
*H04L 5/00* (2006.01)

(52) U.S. Cl.
CPC ........ *H04L 5/1469* (2013.01); *H04L 27/2646* (2013.01); *H04W 48/12* (2013.01); *H04L 5/001* (2013.01); *H04L 5/0023* (2013.01)

(58) Field of Classification Search
CPC ............... H04W 56/004; H04L 5/1469; H04L 27/2607; H04L 27/2646; H04L 5/0023; H04L 5/0028; H04L 5/0092; H04L 5/001; H04L 5/0053; H04L 5/0048; H04L 5/0007; H04L 5/14; H04L 5/0051; H04L 5/0094; H04L 72/0413
See application file for complete search history.

(56) References Cited

U.S. PATENT DOCUMENTS

| | | | | |
|---|---|---|---|---|
| 2012/0188877 A1* | 7/2012 | Chin | .................... | H04W 24/10 370/241 |
| 2013/0028186 A1* | 1/2013 | Kim | .................... | H04B 7/0695 370/328 |
| 2013/0129006 A1* | 5/2013 | Kumar Reddy | .... | H04L 27/2607 375/295 |
| 2013/0301491 A1* | 11/2013 | Bashar | ................ | H04W 76/048 370/280 |
| 2014/0369322 A1* | 12/2014 | Fwu | ...................... | H04W 52/18 370/336 |

FOREIGN PATENT DOCUMENTS

| | | |
|---|---|---|
| KR | 10-2009-0079151 | 7/2009 |
| KR | 10-2010-0026970 | 3/2010 |
| WO | 2009/095369 | 8/2009 |
| WO | 2012/028025 | 3/2012 |
| WO | 2012/065287 | 5/2012 |
| WO | 2012/134534 | 10/2012 |

OTHER PUBLICATIONS

PCT International Application No. PCT/KR2013/008387, Written Opinion of the International Searching Authority dated Dec. 23, 2013, 1 page.

The State Intellectual Property Office of the People's Republic of China Application No. 201380056345.2, Office Action dated Apr. 24, 2017, 6 pages.

* cited by examiner

METHOD AND USER EQUIPMENT FOR TRANSRECEIVING TDD

CROSS-REFERENCE TO RELATED APPLICATIONS

This application is the National Stage filing under 35 U.S.C. 371 of International Application No. PCT/KR2013/008387, filed on Sep. 17, 2013, which claims the benefit of U.S. Provisional Application Nos. 61/719,494, filed on Oct. 29, 2012 and 61/836,107, filed on Jun. 17, 2013, the contents of which are all hereby incorporated by reference herein in their entirety.

BACKGROUND OF THE INVENTION

Field of the Invention

The present invention relates to wireless communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

An uplink channel may be transmitted in an uplink subframe including a plurality of uplink subframes, and a downlink channel may be transmitted through a downlink radio frame including a plurality of downlink subframes.

The uplink subframe and the downlink subframe have been designed by taking propagation delay, etc. into consideration.

However, future next-generation wireless communication can guarantee mobility at a remote place and guarantee a high data transfer rate in a short distance. The uplink subframe and the downlink subframe need to be designed again because there is a possibility that propagation delay may be low in a short distance as described above.

SUMMARY OF THE INVENTION

A disclosure of this specification has an object to improve an uplink subframe and a downlink subframe.

In order to achieve the above object, in accordance with an aspect of the present invention, there is provided a Time Division Duplex (TDD) transmission and reception method. The method may performed by a user equipment and may comprise: receiving first information about a downlink (DL)-uplink (UL) subframe configuration according to TDD from a cell; receiving second information about whether or not to apply a third Cyclic Prefix (CP) shortened compared to a length of a first CP and a second CP; and determining whether or not to apply the third CP based on the second information with respect to a downlink subframe and an uplink subframe based on the first information.

In the determining step, if there is switching between the downlink subframe and the uplink subframe, the third CP is applied to subframes on both sides at a point of time of the switching.

In the determining step, if there is switching between the downlink subframe and the uplink subframe, the third CP is applied to any one subframe.

In the determining step, if the uplink subframe is placed subsequently to the downlink subframe, the third CP is determined to be applied to the downlink subframe or the third CP is determined to be applied to the uplink subframe placed subsequently to the downlink subframe.

In the determining step, if the downlink subframe is placed subsequently to the uplink subframe, the third CP is determined to be applied to the uplink subframe or the third CP is determined to be applied to the downlink subframe placed subsequently to the uplink subframe.

A guard period is generated in a corresponding subframe by applying the third CP. The guard period is placed in one or more of a start portion and end portion of the corresponding subframe.

The guard period is extended by puncturing some symbols within the corresponding subframe to which the third CP is applied.

The method may further comprise: sending a random access preamble on the uplink subframe; and receiving a random access response on the downlink subframe. A length of a timing advance command is shorter than 11 bits within an MAC Protocol Data Unit (PDU) comprising the random access response.

Bits secured by shortening the length of the timing advance command are used for an UL grant and used for information for cell identification.

In order to achieve the above object, in accordance with an aspect of the present invention, there is provided a user equipment, comprising: a reception unit configured to receive first information about a downlink (DL)-uplink (UL) subframe configuration according to TDD from a cell and receives second information about whether or not to apply a third Cyclic Prefix (CP) shortened compared to a length of a first CP and a second CP; and a processor configured to determine whether or not to apply the third CP based on the second information with respect to a downlink subframe and an uplink subframe based on the first information.

In accordance with this specification, radio resources can be efficiently used using a shortened CP when short-distance communication is performed.

BRIEF DESCRIPTION OF THE DRAWINGS

FIGS. 12b and 12c illustrate subheaders illustrated in FIG. 12a.

FIG. 12d illustrates a MAC Random Access Response (RAR) illustrated in FIG. 12a.

DESCRIPTION OF EXEMPLARY EMBODIMENTS

Figure 1:
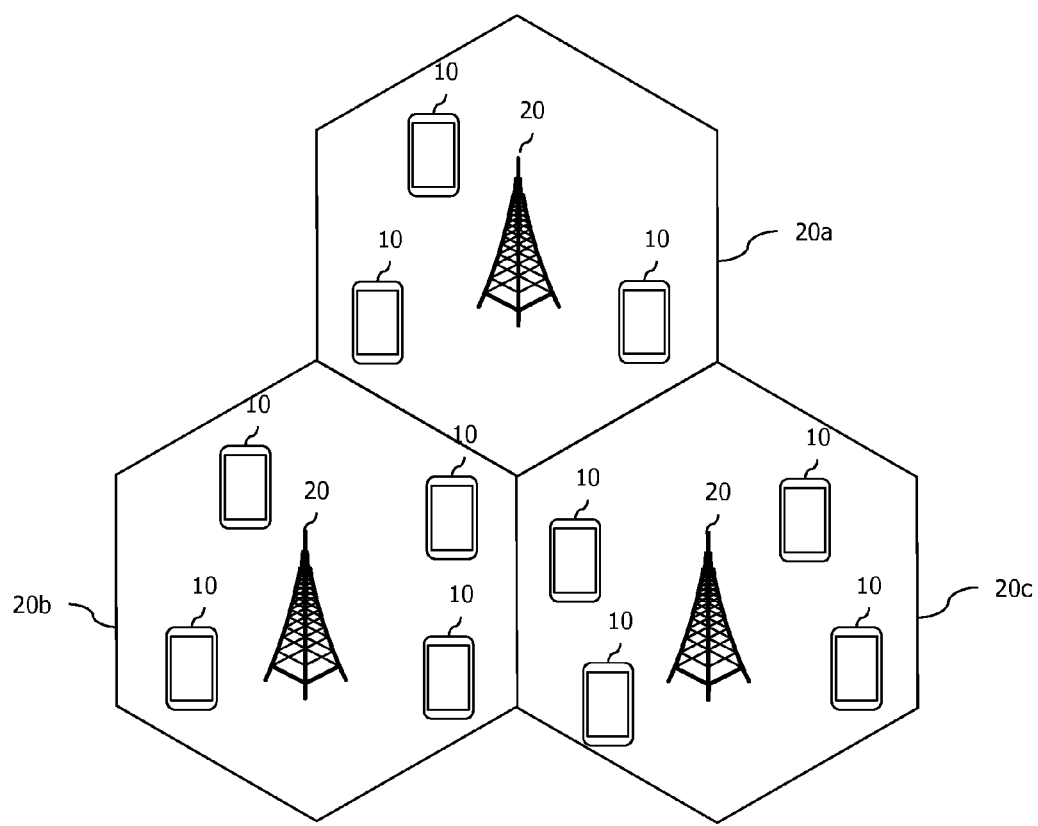
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

The wireless device may be served by a plurality of serving cells. Each serving cell may be defined as a downlink (DL) component carrier (CC) or a pair of the DL CC and an uplink (UP) CC.

The serving cell may be divided into a primary cell and a secondary cell. The primary cell is a cell which operates at a primary frequency, and performs an initial connection establishment process, starts a connection reestablishment process, or is designated as the primary cell during a handover process. The primary cell is also referred to as a reference cell. The secondary cell operates at a secondary frequency, may be set after an RRC (Radio Resource Control) connection is established, and may be used to provide an additional radio resource. At least one primary cell may be continuously set, and the secondary cell may be add/modified/cancelled by higher layer signaling (e.g., an RRC message).

A cell index (CI) of the primary cell may be fixed. For example, a lowest CI may be designated as the CI of the primary cell. Hereinafter, the CI of the primary cell is 0, and CIs of the secondary cell are sequentially allocated from 1.

FIG. 1 shows a wireless communication system.

The wireless communication system includes at least one base station (BS) 20. Respective BSs 20 provide a communication service to particular geographical areas 20a, 20b, and 20c (which are generally called cells). Each cell may be divided into a plurality of areas (which are called sectors). User equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 20 generally refers to a fixed station that communicates with the UE 10 and may be called by other names such as evolved-NodeB (eNB), base transceiver system (BTS), access point (AP), etc.

The terminal generally belongs to one cell and the cell to which the terminal belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
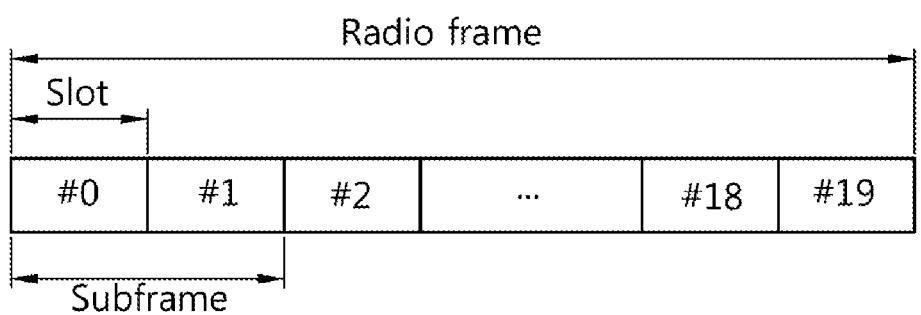
FIG. 2 illustrates the configuration of a radio frame according to FDD in 3GPP LTE.

FIG. 2 shows a downlink radio frame structure according to FDD of 3rd generation partnership project (3GPP) long term evolution (LTE).

The section 5 of 3GPP TS 36.211 V8.2.0 (2008-03) "Evolved Universal Terrestrial Radio Access (E-UTRA); Physical Channels and Modulation (Release 8)" may be incorporated herein.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Although it is described that one slot includes plural OFDM symbols for example, the number of OFDM symbols included in one slot may vary depending on a length of a cyclic prefix (CP).

Figure 3:
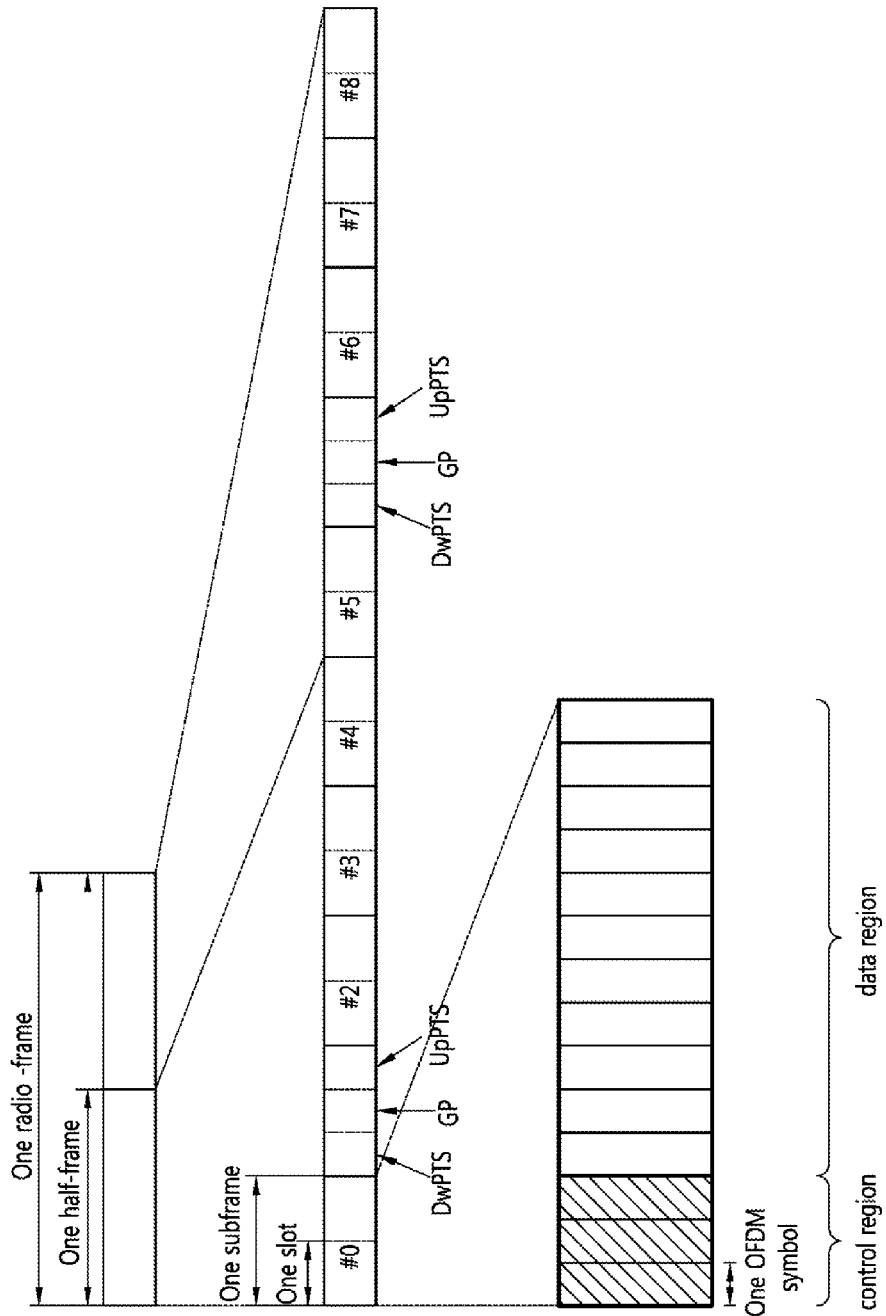
FIG. 3 illustrates the structure of a downlink radio frame according to TDD in 3GPP LTE.

FIG. 3 illustrates the architecture of a downlink radio frame according to TDD in 3GPP LTE.

For this, 3GPP TS 36.211 V8.7.0 (2009-05) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
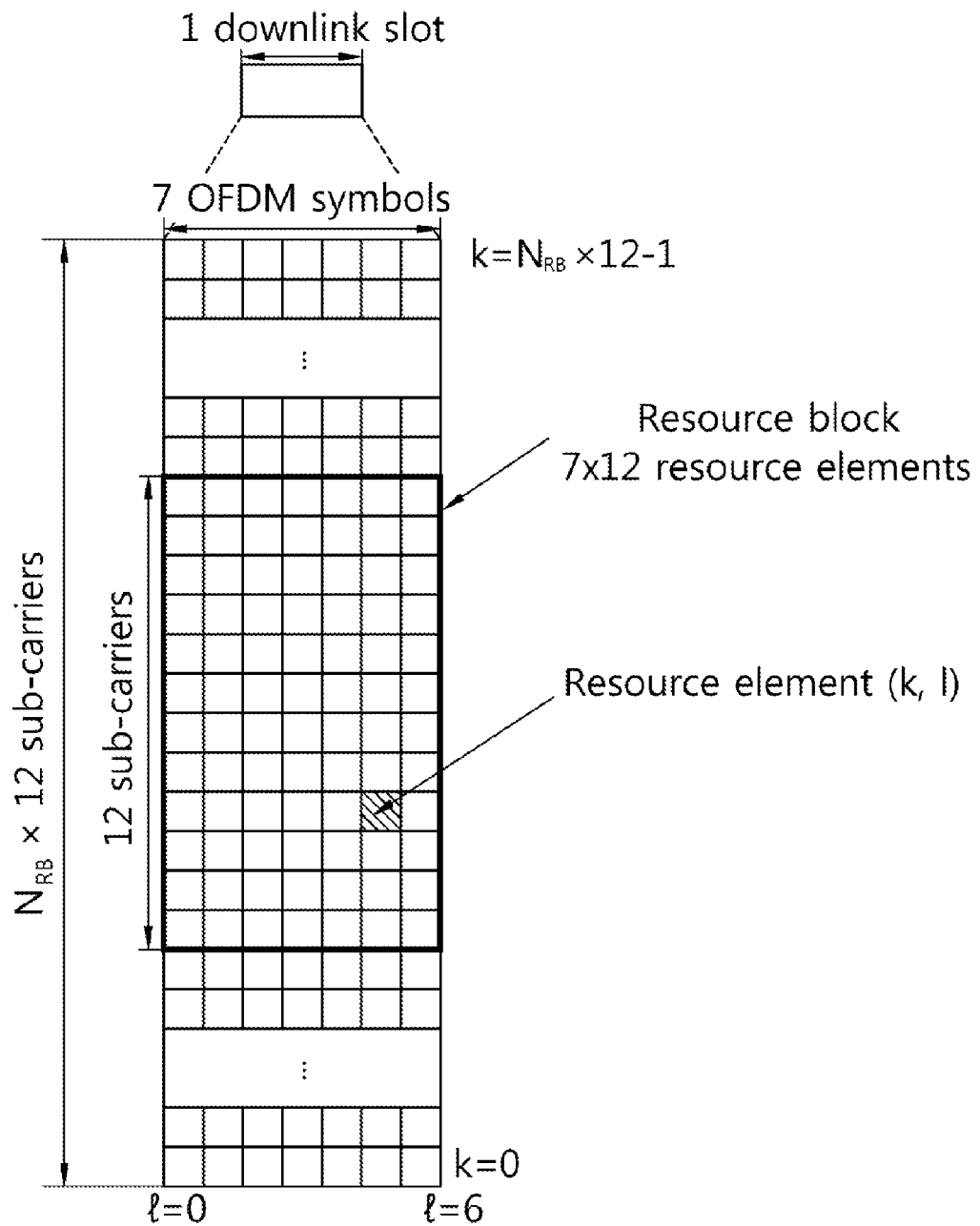
FIG. 4 is an exemplary diagram illustrating a resource grid for a single uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
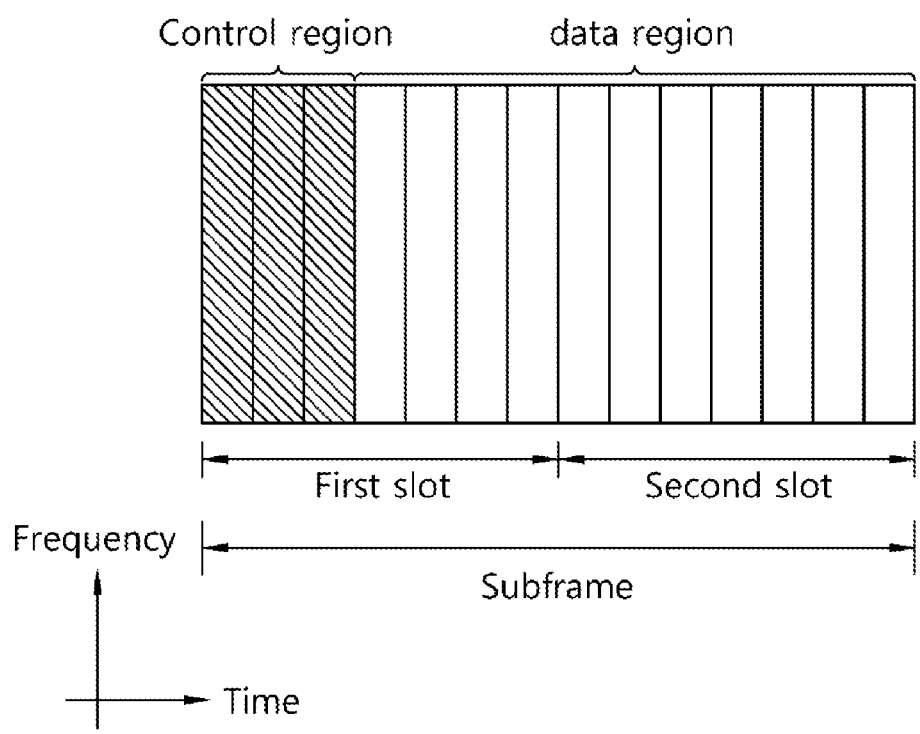
FIG. 5 illustrates the structure of a downlink subframe.

FIG. 5 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
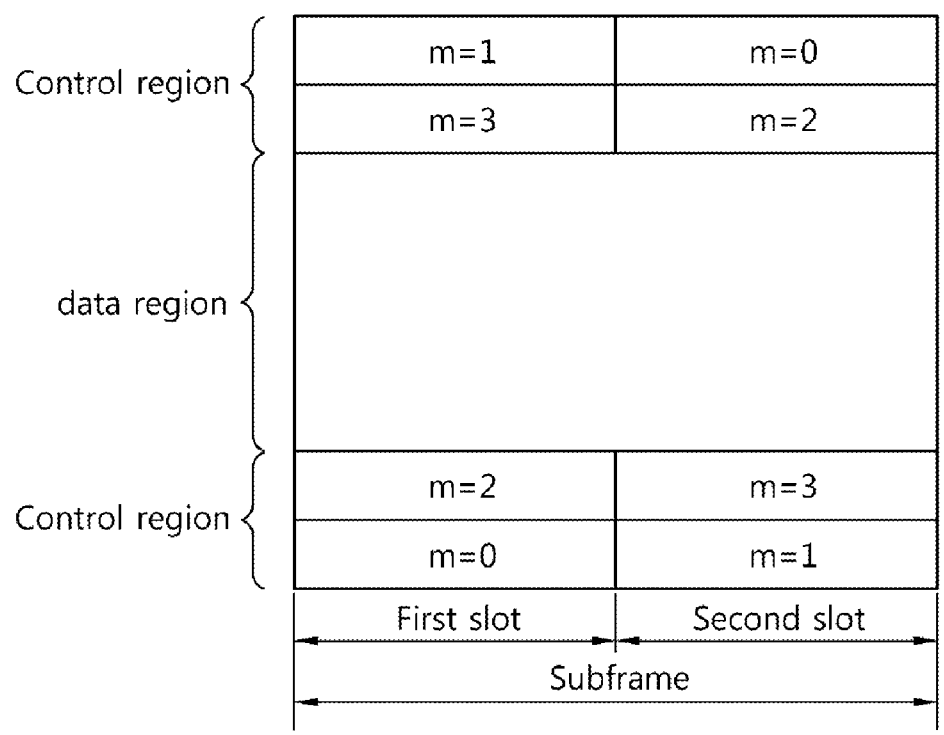
FIG. 6 illustrates the structure of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
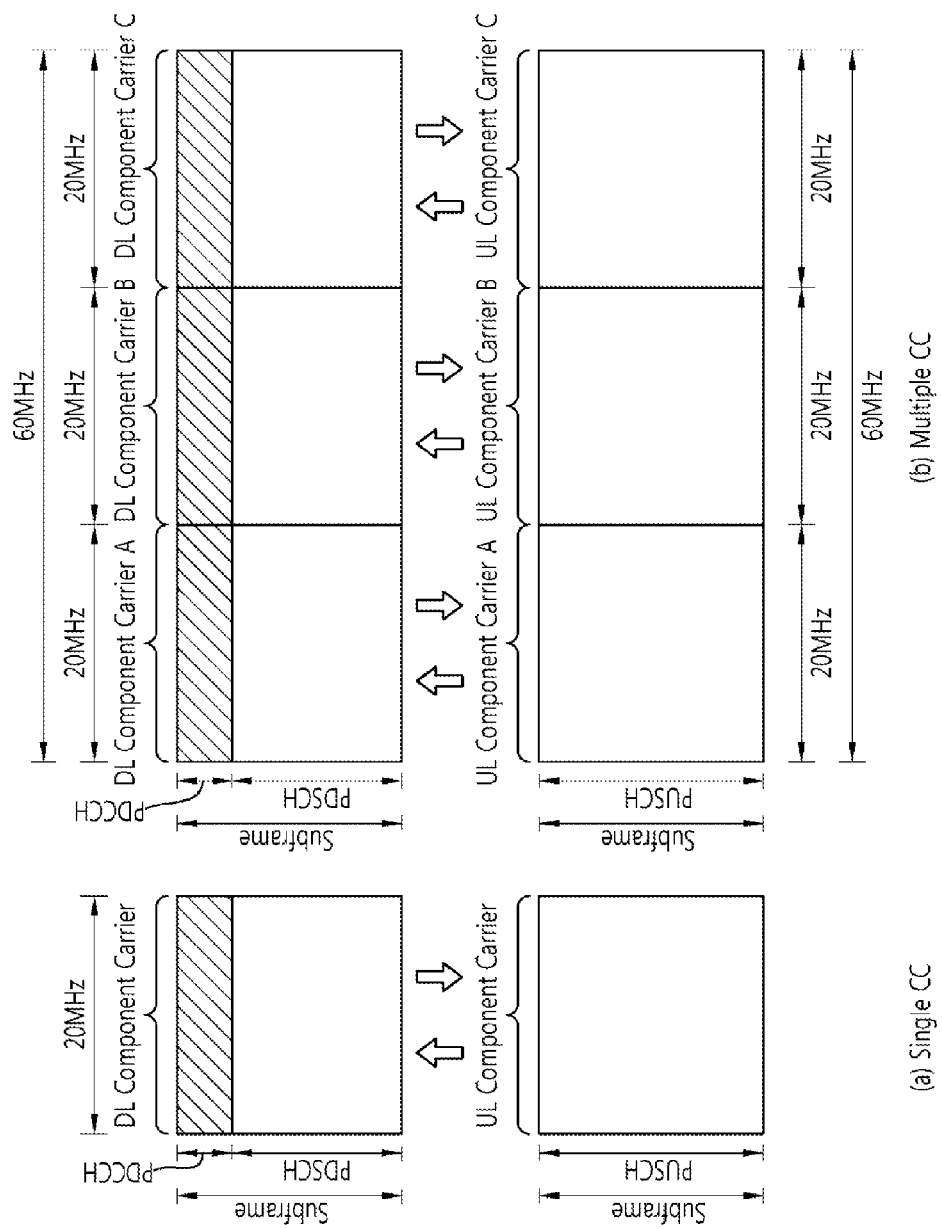
FIG. 7 is an example of a comparison between a single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carriers are contiguous and the case where the control channels are non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
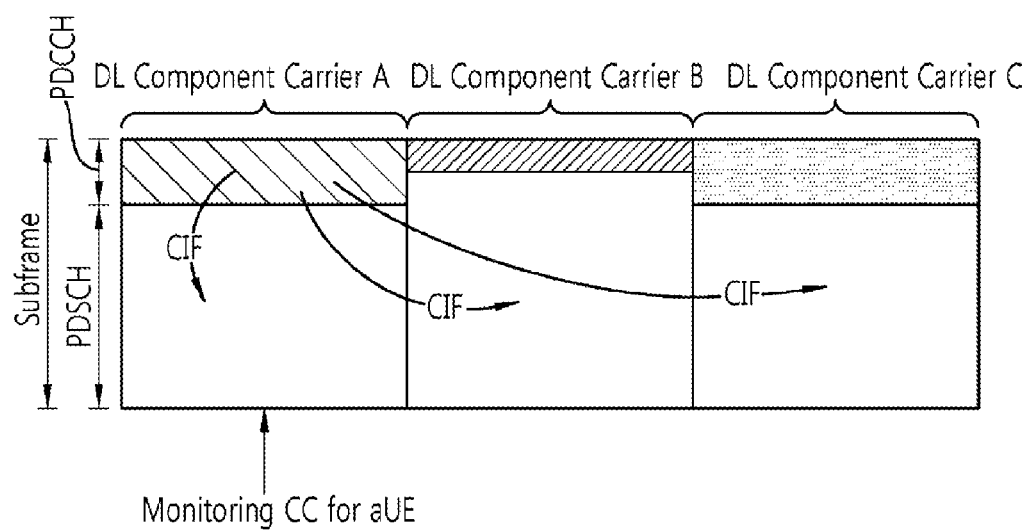
FIG. 8 illustrates cross-carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 9:
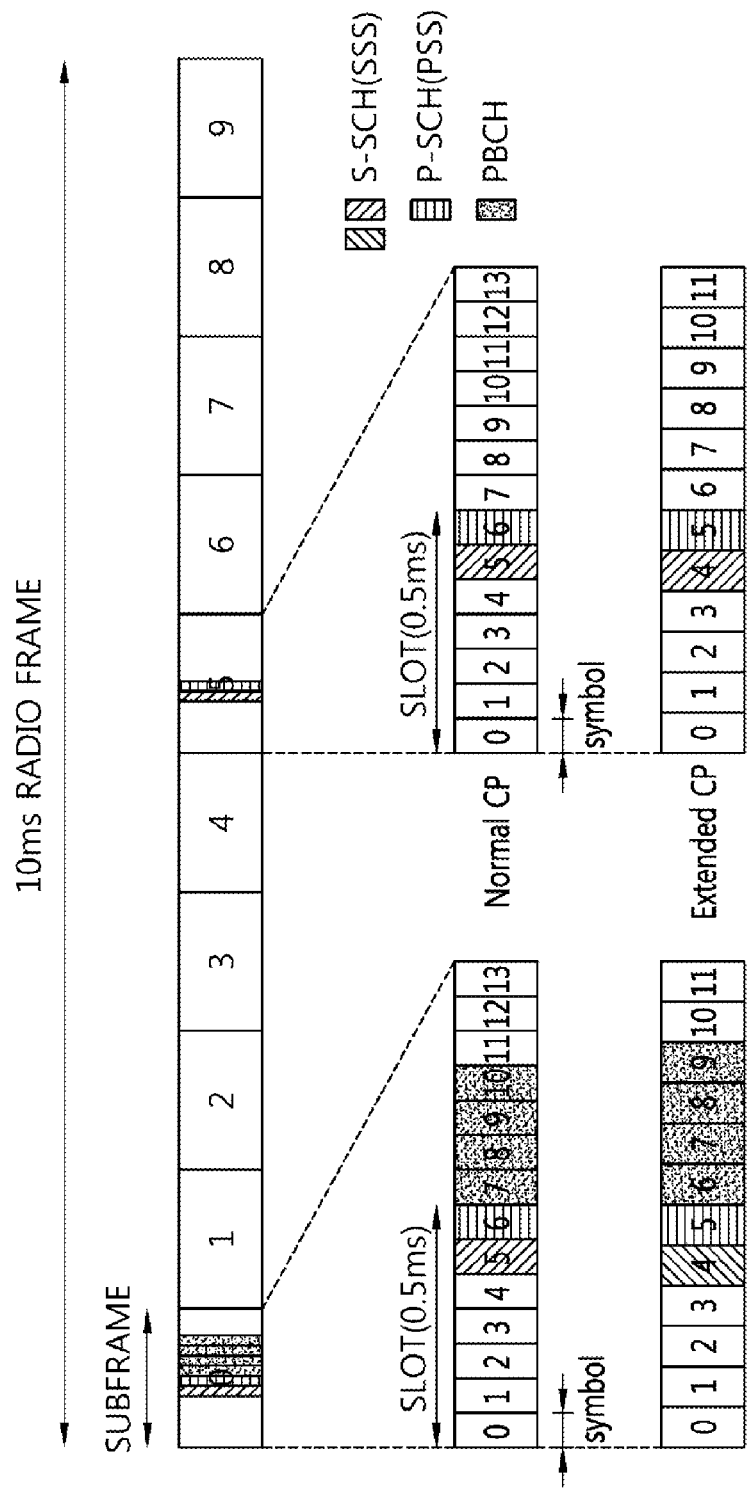
FIG. 9 illustrates the structure of a frame for the transmission of a synchronization signal within an FDD frame.

FIG. 9 illustrates the structure of a frame for the transmission of a synchronization signal within an FDD frame.

A slot number and a subframe number start with 0. UE may perform time and frequency synchronization based on a synchronization signal received from an eNodeB. The synchronization signal of 3GPP LTE-A is used to perform cell search and may be divided into a primary synchronization signal (PSS) and a secondary synchronization signal (SSS). For the synchronization signal of 3GPP LTE-A, reference may be made to Paragraph 6.11 of 3GPP TS V10.2.0 (2011-06).

The PSS is used to obtain OFDM symbol synchronization or slot synchronization and associated with a Physical-layer Cell Identity (PCI). Furthermore, the SSS is used to obtain frame synchronization. Furthermore, the SSS is used to detect the length of a CP and obtain a PCI.

Synchronization signals may be transmitted in a subframe No. 0 and a subframe No. 5 by taking into consideration 4.6 ms, that is, the length of a global system for mobile (GSM) communication frame, for easiness of measurement between radio access technologies (RATs) (inter-RAT measurement). The boundary of the frame may be detected through an SSS. More specifically, in an FDD system, a PSS is transmitted in the last OFDM symbol of a $0^{th}$ slot and tenth slot, and an SSS is transmitted in an OFDM symbol right before a PSS.

A synchronization signal may send any one of a total of 504 physical cell IDs (PCIs) through a combination of 3 PSSs and 168 SSSs. A physical broadcast channel (PBCH) is transmitted in the first 4 OFDM symbols of a first slot. The synchronization signal and the PBCH are transmitted within 6 RBs in the middle of a system bandwidth so that UE performs detection or decoding regardless of a transmission bandwidth. A physical channel in which a PSS is transmitted is called a P-SCH, and a physical channel in which an SSS is transmitted is called an S-SCH.

Figure 10:
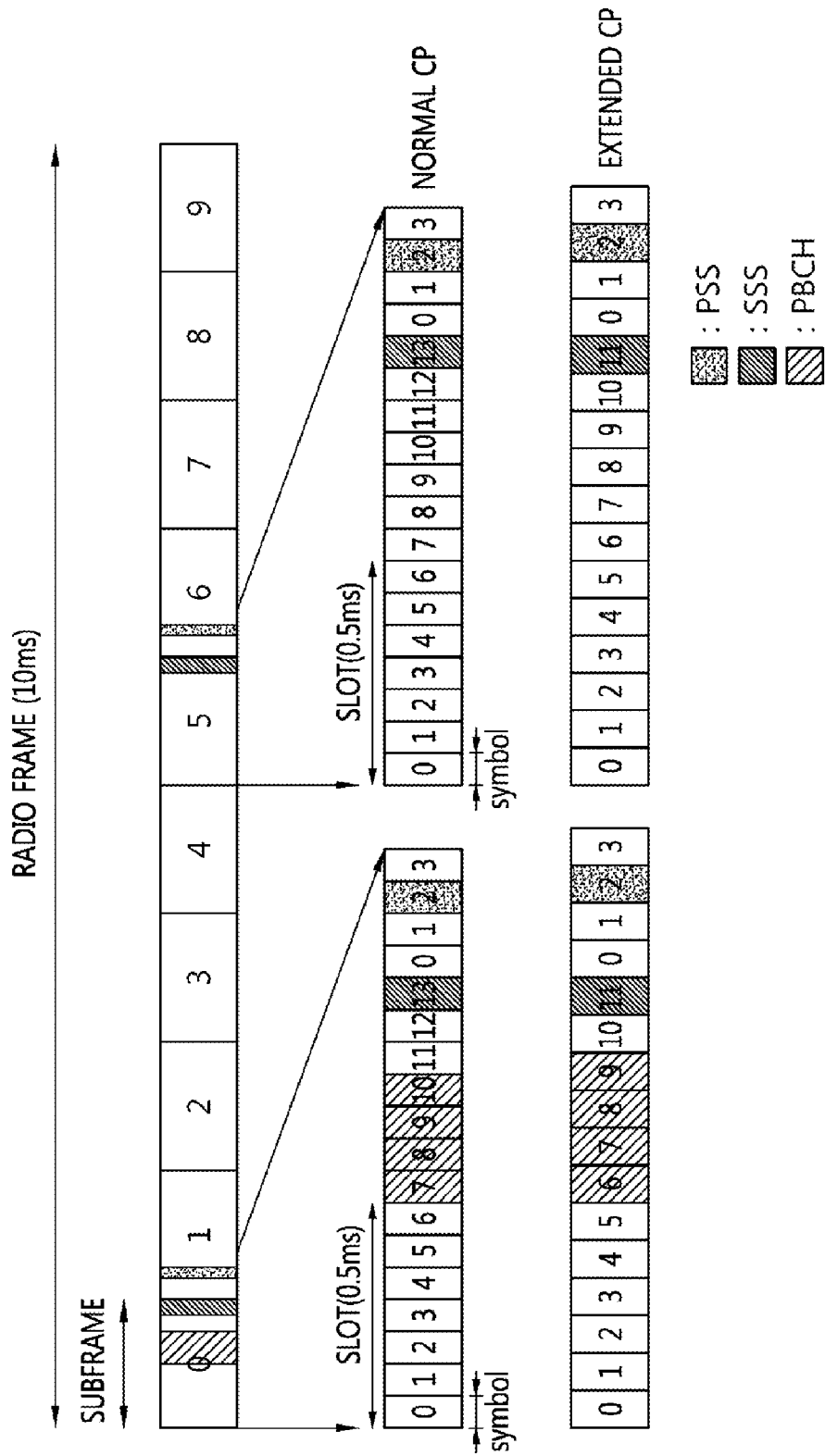
FIG. 10 illustrates an example of the structure of a frame in which a synchronization signal is transmitted in a TDD frame.

FIG. 10 illustrates an example of the structure of a frame in which a synchronization signal is transmitted in a TDD frame.

In a TDD frame, a PSS is transmitted in the third OFDM symbols of a third slot and thirteenth slot. An SSS is transmitted before three OFDM symbols in the OFDM symbol in which the PSS is transmitted. A PBCH is transmitted in the first 4 OFDM symbols of the second slot of a first subframe.

Figure 11A:
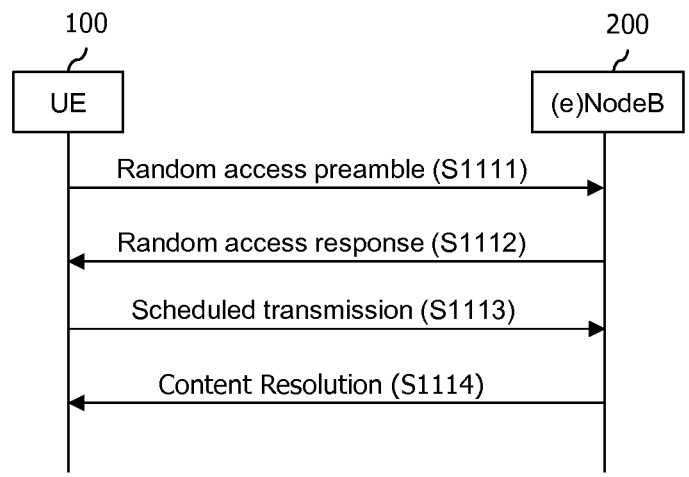
FIG. 11a is a diagram illustrating a contention-based random access method.

FIG. 11*a* is a diagram illustrating a contention-based random access method.

Referring to FIG. 11*a*, UE 100 randomly selects a single random access preamble in a set of random access preambles indicated through system information or a handover command. Furthermore, the UE selects radio resources capable of sending the random access preamble and sends the selected random access preamble (S1111). The radio resources may be a specific subframe and may be for selecting a Physical Random Access Channel (PRACH).

After sending the random access preamble, the UE 100 attempts to receive a Random Access Response (RAR) within a random access response reception window indicated through the system information or handover command and accordingly receives a Random Access Response (RAR) (S1112). The Random Access Response (RAR) may be transmitted in a MAC Protocol Data Unit (PDU) format.

The Random Access Response (RAR) may include a random access preamble identifier (ID), an UL grant (uplink radio resources), a temporary Cell-Radio Network Temporary Identifier (C-RNTI), and a synchronization correction command (e.g., a Timing Advance Command (TAC)). A single Random Access Response (RAR) may include random access response information for one or more pieces of the UE 100. Accordingly, the random access preamble ID may be included in the RAR in order to provide notification that an UL grant, a temporary C-RNTI, and a synchronization correction command (e.g., a Timing Advance Command (TAC)) included in the RAR are effective for which UE 100. The random access preamble ID may be the ID of a random access preamble received by an eNodeB 200. The synchronization correction command (e.g., a Timing Advance Command (TAC)) may be included as information that enables the UE 100 to adjust uplink synchronization. The random access response may be indicated by a random access ID on a PDCCH, that is, a Random Access-Radio Network Temporary Identifier (RA-RNTI).

When receiving a Random Access Response (RAR) effective for the UE, the UE 100 processes information included in the Random Access Response (RAR) and performs scheduled transmission to the eNodeB 200 (S1113). That is, the UE 100 applies the synchronization correction command (e.g., a Timing Advance Command (TAC)) and stores a temporary C-RNTI. Furthermore, the UE sends data, stored in the buffer of the UE 100, or newly generated data to the eNodeB 200 using an UL grant. In this case, information capable of identifying the UE 100 needs to be included in the data. The reason for this is that it is necessary to subsequently identify the UE 100 in order to solve a collision because the eNodeB 200 is unable to determine that what pieces of the UE 100 perform random access in a contention-based random access process.

After sending the data including its own ID through the UL grant allocated by receiving the Random Access Response (RAR), the UE 100 waits for the instruction of the eNodeB 200 in order to solve a collision (S1114). That is, in order to receive a specific message, the UE attempts to receive a PDCCH.

Figure 11B:
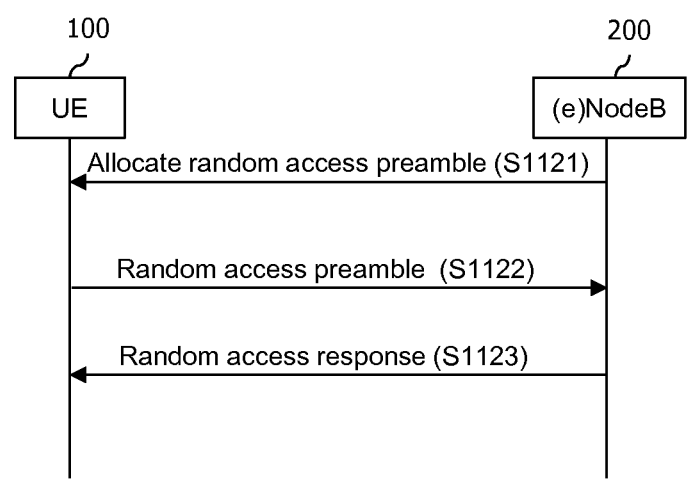
FIG. 11b is a diagram illustrating a non-contention-based random access method.

FIG. 11b is a diagram illustrating a non-contention-based random access method.

Unlike contention-based random access, non-contention-based random access may be terminated when the UE 100 receives a random access response.

The non-contention-based random access may be initiated by a request, such as handover and/or the command of the eNodeB 200. In the aforementioned two cases, contention-based random access may also be performed.

The UE 100 receives a designated random access preamble not having a collision possibility which has been assigned by the eNodeB 200. The assignment of the random access preamble may be performed through a handover command and the PDCCH command (S1121).

After receiving the assigned random access preamble designated therefor, the UE 100 sends the corresponding random access preamble to the eNodeB 200 (S1122).

When receiving the random access preamble, the eNodeB 200 sends a Random Access Response (RAR) to the UE 100 in response to the random access preamble (S1123).

Figure 12A:
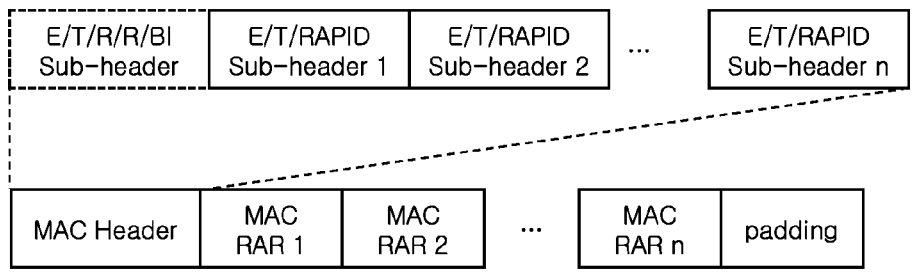
FIG. 12a is an exemplary diagram illustrating the structure of a MAC Protocol Data Unit (PDU) including a random access response.
Figure 12B:
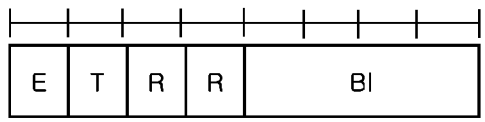
Figure 12C:
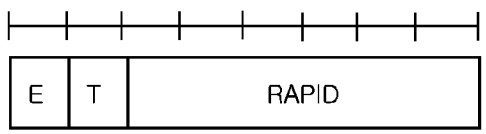
Figure 12D:
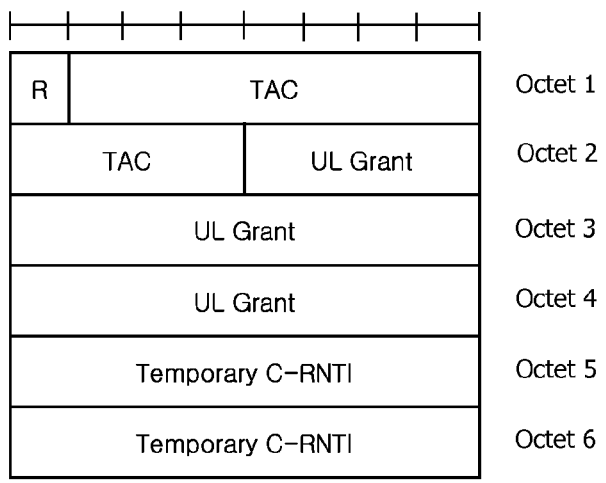

FIG. 12a is an exemplary diagram illustrating the structure of a MAC Protocol Data Unit (PDU) including a random access response, FIGS. 12b and 12c illustrate subheaders illustrated in FIG. 12a, and FIG. 12d illustrates a MAC Random Access Response (RAR) illustrated in FIG. 12a.

As may be seen with reference to FIG. 12a, the MAC PDU may include a MAC header and 0 (zero) or one or more MAC Random Access Responses (RARs).

The MAC header may include or not include E/T/R/R/BI subheaders indicated by a dotted line. The MAC header may include one or a plurality of (e.g., n) E/T/RAPID subheaders.

As illustrated in FIG. 12b, the E/T/R/R/BI subheaders may include five fields, that is, one E field, one T field, two R fields, and one Back-off Indicator (BI) field.

As illustrated in FIG. 12c, the E/T/RAPID subheaders may include an E field, T field, and RAPID field.

As illustrated in FIG. 12d, the MAC Random Access Response (RAR) may include 4 fields, that is, an R field, a synchronization correction command (e.g., a Timing Advance Command (TAC)) field, an UL grant field, and a temporary C-RNTI field. As illustrated 11, the Timing Advance Command (TAC) field is the length of bits (7 bits of an illustrated octet 1+4 bits of an illustrated octet 2). The UL grant field is the length of 20 bits (4 bits of the octet 2+8 bits of an octet 3+8 bits of an octet 4). Furthermore, the temporary C-RNTI has a length of 16 bits.

An aspect of the present invention is described below.

Figure 13:
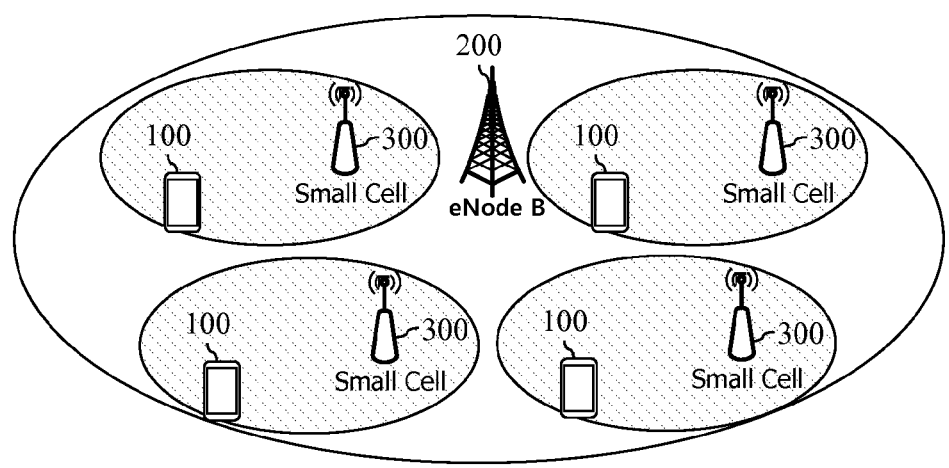
FIG. 13 is a diagram illustrating a heterogeneous network in which a macro cell and small cells having a possibility that they may become a next-generation wireless communication system are mixed.

FIG. 13 is a diagram illustrating a heterogeneous network in which a macro cell and small cells having a possibility that they may become a next-generation wireless communication system are mixed.

In a next-generation communication standard including 3GPP LTE-A, a heterogeneous network in which small cells having low-power transmission power, for example, pico cells, femto cells, or micro cells are overlapped and present within existing macro cell coverage is being discussed.

Referring to FIG. 13, a macro cell may overlap with one or more micro cells. The service of the macro cell is provided by a macro eNodeB (MeNB). In this specification, a macro cell and a macro eNodeB may be interchangeably used. UE 100 that has accessed the macro cell may be denoted as macro UE 100. The macro UE 100 receives a downlink signal from the macro eNodeB and sends an uplink signal to the macro eNodeB.

The small cell is also called a femto cell, a pico cell, or a micro cell. The service of the small cell is provided by a pico eNodeB, a home eNodeB (HeNB), a Relay Node (RN), etc. For convenience sake, a pico eNodeB, a home eNodeB (HeNB), and a Relay Node (RN) are collectively called a home eNodeB (HeNB). In this specification, a micro cell and a home eNodeB may be interchangeably used. The small cell may be divided into an Open Access (OA) cell and a Closed Subscriber Group (CSG) cell depending on accessibility. The OA cell means a cell from which the UE 100 may be provided with service anytime, if necessary, without a separate access limit. In contrast, the CSG cell means a cell from which only allowed specific UE 100 can be provided with service.

In such a heterogeneous network, the coverage gap of a macro cell can be filled by setting the macro cell as a PCell and setting a small cell as an SCell. Furthermore, overall performance can be boosted up by setting a small cell as a PCell and setting a macro cell as an SCell.

Figure 14:
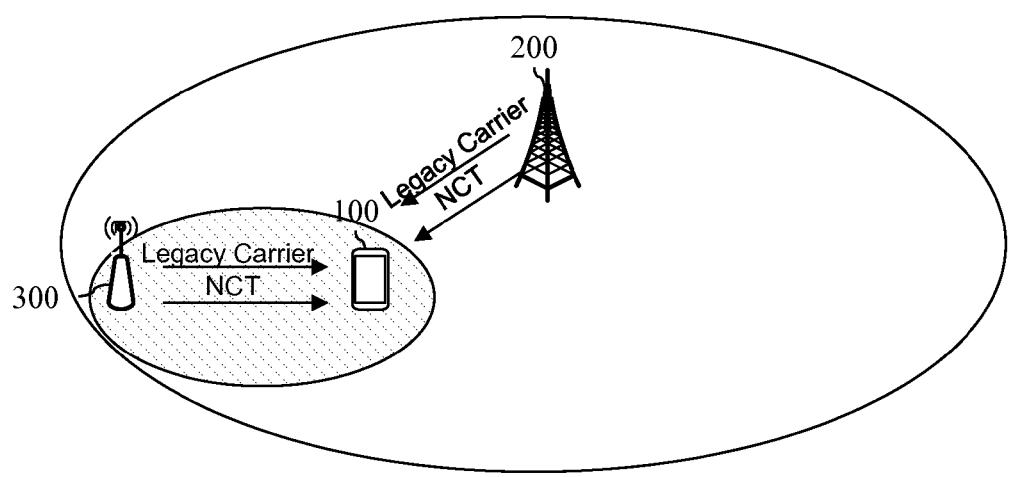
FIG. 14 illustrates a new carrier for a next-generation wireless communication system.

FIG. 14 illustrates a new carrier for a next-generation wireless communication system.

In an existing wireless communication system based on 3GPP LTE/LTE-A, a reference signal, a synchronization signal, a control channel, etc. are transmitted through downlink carriers. As described above, a downlink carrier based on 3GPP LTE/LTE-A is also called an existing (legacy) carrier.

However, in a next-generation wireless communication system, a new carrier may be introduced in order to reduce interference between a plurality of serving cells and improve the extensibility of carriers. This is also called an extension carrier or a New Carrier Type (NCT). A cell based on an extended carrier is called an extended cell.

If a subframe of an existing type is used in a primary cell, that is, a PCell, and an NCT subframe is used in a secondary cell, that is, an SCell, the configuration of the subframe may be signaled through the primary cell, that is, the PCell. The secondary cell in which the NCT subframe is used, that is, the SCell may be activated by the primary cell.

In such an NCT, the transmission of a CRS transmitted at a fixed and high density is omitted or significantly reduced. In an existing carrier, a CRS is transmitted in all the downlink subframes over the entire system band, whereas in the NCT, the CRS may not be transmitted or may be transmitted in a specific downlink subframe over some of a system band. Accordingly, in the NCT, the CRS is not used for demodulation and may be used for synchronization tracking. In this aspect, the CRS may also be called a Tracking RS (TRS), an enhanced Synchronization Signal (eSS), or a Reduced CRS (RCRS).

In an existing carrier, a PDCCH is demodulated based on a CRS. In the NCT, however, a PDCCH may not be transmitted. In an existing carrier, a CRS is used for data demodulation, but in the NCT, only a URS (and/or a UE-specific RS) is used for data demodulation.

Accordingly, UE receives downlink data based on an URS or DM-RS and measures a channel state based on a CSI-RS transmitted in a relatively low density.

As described above, since overhead attributable to a reference signal is minimized, reception performance can be improved and radio resources can be efficiently used.

Figure 15:
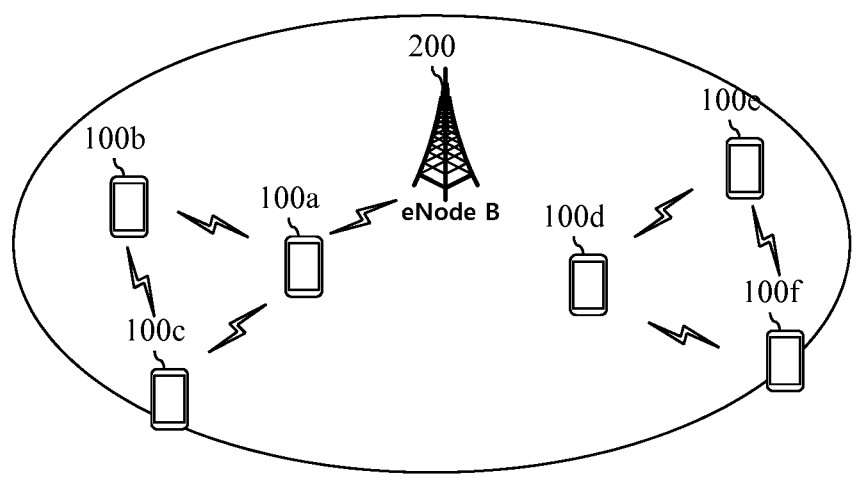
FIG. 15 is an exemplary diagram illustrating the concept of Device to Device (D2D), that is, communication between pieces of UE having a possibility that they may become a next-generation wireless communication system.

FIG. 15 is an exemplary diagram illustrating the concept of Device to Device (D2D), that is, communication between pieces of UE having a possibility that they may become a next-generation wireless communication system.

Meanwhile, in a next-generation communication standard including 3GPP LTE-A, Device To Device (D2D), that is, communication between pieces of UE, may be permitted.

As illustrated in FIG. 15, pieces of UE 100 may directly communicate with each other without the intervention of an eNodeB 200. Alternatively, the pieces of UE 100 may directly communicate with each other with the help of the eNodeB 200. In this case, pieces of specific UE 100a and 100d may function as relay nodes for pieces of UE 100b, 100c, 100e, and 100f placed in the outskirts of a cell. In such a case, the specific UE 100a, 100d functioning as the relay node may be considered to be a small cell.

As described above, in a next-generation system, it is expected that communication using a small cell having a small cell coverage radius and communication (i.e., D2D) between pieces of UE that is expected to easily secure a short distance and the Line of Sight (LoS) of propagation will be introduced. It is expected that a utilization density and region will be gradually widened.

In such a next-generation system, there is a good possibility that a channel environment advantageous for securing the LoS of propagation may be present. In this case, since propagation delay may be relatively small compared to a macro cell environment, the length of a Cyclic Prefix (CP) proposed in existing 3GPP LTE release-10 systems may be unnecessarily long. A shortened CP may be additionally introduced. Furthermore, as described above, in a next-generation system, a new carrier type may be proposed, and a shortened CP may be used in the NCT.

Accordingly, an object of a first embodiment proposed in this specification is to propose a new CP that occupies a Cyclic Prefix (CP) length smaller than a CP length or a small number of samples proposed in an existing 3GPP LTE release-10 system.

In accordance with the first embodiment of this specification, the new CP is named a shortened CP. In this case, the length of the shortened CP is meant to be shorter than that of a normal CP. In accordance with a first embodiment of this specification, there is proposed a reference configuration scheme for applying such a shortened CP. Furthermore, in accordance with a first embodiment of this specification, there is also proposed a scheme for setting a guard period when an UL subframe and a DL subframe are dynamically configured in a TDD environment using a region or samples secured when a shortened CP is applied.

Meanwhile, in a next-generation system, propagation delay may be said to be relatively small compared to a macro cell environment. In such a case, if the length between a transmitter and a receiver, that is, the subject of communication, is reduced by a specific level, a Timing Advance Command (TAC) may not be extremely required or may be limitedly used. However, the length of a Timing Advance Command (TAC) proposed in an existing 3GPP LTE release-10 system is 11 bits, that is, extremely long. Accordingly, an object of a second embodiment of the present invention is to propose a scheme for reducing the length of a Timing Advance Command (TAC) and using the reduced length for other purposes.

The first embodiment proposed in this specification is described below with reference to FIG. 16, and the second embodiment proposed in this specification is described below with reference to FIG. 17.

Figure 16A:
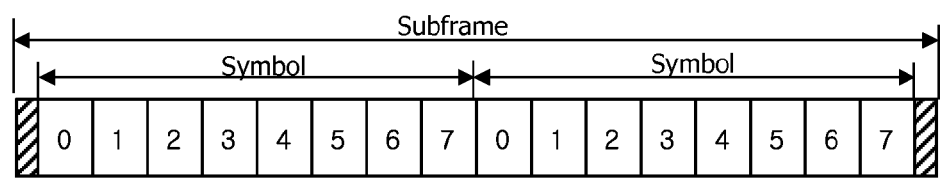
FIGS. 16a, 16b, and 16c are exemplary diagrams illustrating examples of shortened Cyclic Prefixes (CPs) in accordance with a first embodiment of this specification.
Figure 16B:
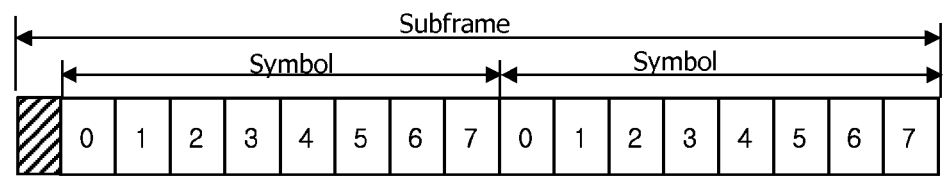
Figure 16C:
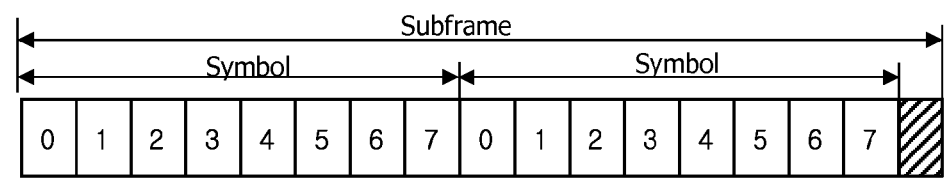

FIGS. 16a, 16b, and 16c are exemplary diagrams illustrating examples of shortened Cyclic Prefixes (CPs) in accordance with a first embodiment of this specification.

As illustrated in FIGS. 16a, 16b, and 16c, if a shortened CP is used, the number of OFDM symbols within a single subframe may be a maximum of 14. The reason why the maximum number of OFDM symbols is 14 is as follows. In an existing 3GPP LTE Rel-10 system, if all CPs are removed, a maximum number of OFDM symbols are 15. In this case, a single OFDM symbol experiences a situation in which it extends to a slot boundary. A situation not having delay spread may not be considered to be common, and the maximum number of OFDM symbols within a subframe to which a shortened CP s applied is preferred in order to avoid the situation in which an OFDM symbol extends to a slot boundary.

If a maximum number of symbols is 14 in a subframe in which a shortened CP is used as described above, secured redundant duration (or samples) (indicated by slashes) may be used as guard periods.

The guard periods (indicated by slashes) may be placed at both ends of a subframe as illustrated in FIG. 16a, may be placed at the front of the subframe as illustrated in FIG. 16b, and may be placed at the end of the subframe as illustrated in FIG. 16c.

The shortened CP may be applied to both an FDD system and a TDD system. However, in order to further increase effectiveness, the shortened CP preferably may be applied to a half duplex FDD system. In this case, half duplex FDD may mean that UE may not simultaneously support UL and DL within one subframe. Furthermore, in order to further increase effectiveness, the shortened CP may be applied to a TDD system.

The guard period may be used for a timing advance (TA), and/or a processing time (e.g., a switching time and an RF advance time) at a point of time at which a DL subframe and an UL subframe are changed in a TDD system.

A specific cell may support one CP or a plurality of CPs of a normal CP, an extended CP, and a shortened CP. If a specific cell supports a shortened CP in addition to the normal CP and the extended CP, the UE 100 may perform blind detection on the three types of CPs through a PSS/SSS transmission method (the locations of OFDM samples, a time axis location, etc.). Alternatively, if a specific cell supports only a normal CP and a shortened CP, the UE 100 may perform blind detection on the two types of CPs through a PSS/SSS transmission method.

That is, each cell may configure two types or more of CPs. For example, one CP (first CP) may be set as a normal CP or extended CP, and the other CP (second CP) may be set as a shortened type. In another example, if the first CP is an extended CP, the second CP may be set as a normal CP or shortened CP.

Meanwhile, if a shortened CP is interchangeably used with a normal CP or extended CP, the number of OFDM symbols within a subframe to which the shortened CP has been applied is not 14 as described above, but may be changed. For example, the number of OFDM symbols within a subframe to which a shortened CP has been applied may be the same as the number of symbols according to the normal CP or extended CP. For a detailed example, if an extended CP and a shortened CP are interchangeably used, the number of OFDM symbols within a subframe to which the shortened CP has been applied may be the same as 12, that is, the number of OFDM symbols within a subframe to which the extended CP has been applied.

Meanwhile, the UE 100 may be notified of information about the configured types of CPs through a cell-specific high layer signal.

Furthermore, the UE 100 may be notified of whether each cell uses the shortened CP through a cell-specific high layer signal. A cell using the shortened CP may previously designate whether it uses the shortened CP for each subframe/slot or may notify the UE 100 of whether it uses the shortened CP through a high layer signal. To use a signal of a bitmap type or to transfer a configuration represented in a bitmap type to the UE 100 may be taken into consideration as a scheme for indicating whether the shortened CP is applied or not for each subframe/slot.

Meanwhile, if the two types or more of CPs are mixed for each subframe/slot as described above, a shortened CP may not be applied to a subframe in which a TRS and a PSS/SSS are transmitted. A ground for this is to secure stabilized performance of synchronization and tracking. Such a subframe may be a subframe having index 0 and 5. Alternatively, the subframe may be a subframe having indices 0, 1 and 5, 6 or a subframe having indices 1 and 6.

FIGS. 17*a* to 17*g* are exemplary diagrams illustrating schemes for shortening the length of a shortened Cyclic Prefix (CP) and using it in TDD in accordance with a first embodiment of this specification.

Figure 17A:
FIGS. 17a to 17g are exemplary diagrams illustrating schemes for shortening the length of a shortened Cyclic Prefix (CP) and using it in TDD in accordance with a first embodiment of this specification.
Figure 17B:
Figure 17C:

As may be seen with reference to FIG. 17*a*, in a TDD system, a shortened CP may be applied to all the subframes. In this case, guard periods (indicated by slashes) secured due to the use of a shortened CP may be placed at the start and end of a subframe. Alternatively, as may be seen with reference to FIG. 17*b*, a guard period (indicated by slashes) secured due to the use of a shortened CP may be placed at the end portion of a subframe. Alternatively, as may be seen with reference to FIG. 17*c*, a guard period (indicated by slashes) secured due to the use of a shortened CP may be placed at the start portion of a subframe.

Figure 17D:
Figure 17E:

Alternatively, as illustrated in FIG. 17*d*, in a TDD system, a shortened CP may be applied to an UL subframe placed subsequently a DL subframe. In this case, a guard period may be placed at the start portion of the UL subframe. Alternatively, as illustrated in FIG. 17*e*, a shortened CP may be applied to a DL subframe placed subsequently to a UL subframe. Even in this case, a guard period may be placed at the start portion of the DL subframe. However, in a modified example, if an UL subframe is placed subsequently to a DL subframe, a shortened CP may be applied to the corresponding DL subframe. In this case, a guard period may be placed at the end portion of the corresponding DL subframe. Likewise, if a DL subframe is placed subsequently to an UL subframe, a shortened CP may be applied to the corresponding UL subframe. In this case, a guard period may be placed at the end portion of the corresponding UL subframe.

Figure 17F:

Meanwhile, as illustrated in FIG. 17*f*, if an UL subframe is placed subsequently to a DL subframe, a shortened CP may be applied to both the corresponding DL subframe and UL subframe. In this case, a guard period may be placed at the end portion of the corresponding DL subframe, and a guard period may be placed at the start portion of the corresponding UL subframe. In contrast, if a DL subframe is placed subsequently to an UL subframe, a shortened CP may be applied to both the corresponding DL subframe and UL subframe.

Figure 17G:

Meanwhile, as illustrated in FIG. 17*g*, if a DL subframe and an UL subframe are alternately disposed, a shortened CP may be applied to each of the subframes. In this case, a guard period may be placed at the start portion or end portion of the subframe.

In accordance with the aforementioned example, a limit in which the number of UL-DL configurations was only 7 as in Table 1 in a prior art can be obviated. That is, the macro cell/small cell 200/300 may dynamically change a DL-UL configuration freely. In particular, if a shortened CP is applied, a guard period is generated. Accordingly, a DL-UL configuration can be freely changed even without using a special subframe.

When a special subframe is not used, if guard periods generated by applying a shortened CP are not sufficient, the number of guard periods may be increased by puncturing some OFDM symbols.

Meanwhile, in a TDD system, if the macro cell/small cell 200/300 has sent an UL-DL configuration to the UE 100 through an SIB, but an actual operation is different, for example, if an UL subframe is flexibly used as a DL subframe instead or a DL subframe is flexibly used as an UL subframe instead, problems that may occur may be solved through a guard period by applying a shortened CP. In this case, if a guard period is not sufficient, guard periods may be increase by puncturing some OFDM symbols.

If guard periods generated by applying a shortened CP are used as described above, a DL-UL configuration can be dynamically changed freely. That is, a type in which a change of a DL subframe and UL subframe is small may be taken into consideration, and a case where the density of UL SFs is high may also be taken into consideration. The following is an example of a new DL-UL subframe configuration.

1. DL:UL=8:2 ratio

Each UL subframe may have a 2, 7 index as in the DL/UL configuration 2 of Table 1 or may have a 2, 3 index as in the DL/UL configuration 4 of Table 1. Additionally, a result of a DL/UL subframe combination through another combination may also be possible as a new configuration. An UL subframe according to the new configuration may be a subframe having indices other than the index of a DL subframe corresponding to an SCH, a PBCH, an SIB1, a discovery signal. The combination may be {3, 4}, {3, 8}, {4, 9}, {7, 8}, {8, 9}. The reason for this is to set a region in which a PBCH or SCH is transmitted as a DL subframe. If the index of a subframe in which some SCHs are transmitted is adjusted, a corresponding DL subframe (e.g., a subframe having a 1, 6 index) may be taken into consideration as being additionally used as an UL subframe. If the combination of the {1, 6} index may be additionally used as an UL subframe, a subframe having a {1, 6}, {1, 2}, {6, 7} index may be additionally taken into consideration as an UL subframe in the new configuration. Alternatively, the 3 symbols of a corresponding subframe may be used as DL although the subframe index 1 or 6 switches to an UL subframe and is used. In this case, guard periods may be placed at the boundary of a DL symbol and UL symbol in the corresponding subframe.

2. DL:UL=2:8 ratio

A subframe in which major DL channels are transmitted may be adjusted so that it has a 0, 5 index by adjusting the index of a subframe in which some SCHs are transmitted. In this case, a subframe having the remaining indices may be used as an UL subframe. Alternatively, the former three symbols may be used as DL although the subframe index 1 or 6 switches to an UL subframe and is used. In this case, a guard period may be placed at the boundary of a DL symbol and UL symbol in the corresponding subframe.

3. DL:UL=7:3 ratio

In accordance with a new UL/DL configuration, an UL subframe may be used as a subframe having indices other than the index of a DL subframe corresponding to a PBCH, an SCH, an SIB1, a discovery signal. That is, an UL subframe according to a new UL/DL configuration may be a subframe having an index {2, 3, 7}, {2, 3, 8}, {2, 3, 9}, {3, 4, 7}, {3, 4, 8}, {3, 4, 9}, {2, 7, 8}, {3, 7, 8}, {4, 7, 8}, {2, 8, 9}, {3, 8, 9}, {4, 8, }, or {7, 8, 9}. The index of a subframe in which major DL channels are transmitted may be limited to 0, 5 by adjusting the index of a subframe in which some SCHs are transmitted. In this case, a subframe having indices 1, 6 may be additionally used as an UL subframe. For example, a combination of {1, 2, 3}, {6, 7, 8}, etc. may be additionally taken into consideration. If the index of a subframe in which some SCHs are transmitted is not controlled, the former three symbols of the subframe index 1 or 6 may be used as DL. In this case, a guard period may be placed at the boundary of a DL symbol and UL symbol in the corresponding subframe.

4. DL:UL=3:7 ratio

A subframe in which major DL channels (e.g., a PBCH, an SCH, an SIB1, a discovery signal) are transmitted may be adjusted so that it has a 0, 5 index by adjusting the index of a subframe in which some SCHs are transmitted. In this case, in a new configuration, an UL subframe may be a subframe having an index {1, 2, 3, 4, 7, 8, 9} or {2, 3, 4, 6, 7, 8, 9}. Alternatively, the former three symbols of the subframe index 1 or 6 may be used as DL for the transmission of an SCH although the subframe index 1 or 6 switches to an UL subframe and is used. In this case, a guard period may be placed at the boundary of a DL symbol and UL symbol in the corresponding subframe.

5. DL:UL=6:4 ratio

A subframe in which major DL channels (e.g., a PBCH, an SCH, an SIB1, a discovery signal) are transmitted may be adjusted so that it has a 0, 5 index by adjusting the index of a subframe in which some SCHs are transmitted. In this case, in a new configuration, an UL subframe may be a subframe having an index {1, 2, 3, 4} or {6, 7, 8, 9}. Alternatively, although a subframe having an index 1 or 6 switches to an UL subframe and is used, the former three symbols of the subframe may be used as DL for the transmission of an SCH. In this case, a guard period may be placed at the boundary of a DL symbol and UL symbol in the corresponding subframe.

6. DL:UL=4:6 ratio

A subframe in which major DL channels (e.g., a PBCH, an SCH, an SIB1, a discovery signal) are transmitted may be adjusted so that it has a 0, 5 index by adjusting the index of a subframe in which some SCHs are transmitted. In this case, in accordance with a new configuration, an UL subframe may be a subframe having indices {1, 2, 3, 6, 7, 8}. Alternatively, although a subframe having an index 1 or 6 switches to an UL subframe and is used, the former three symbols of the subframe may be used as DL for the transmission of an SCH. In this case, a guard period may be placed at the boundary of a DL symbol and UL symbol in the corresponding subframe.

7. DL:UL=5:5 ratio

A subframe in which major DL channels (e.g., a PBCH, an SCH, an SIB1, a discovery signal) are transmitted may be made to have a 0, 5 index by adjusting the index of a subframe in which some SCHs are transmitted. In this case, an UL subframe according to a new configuration may be a subframe having a {1, 2, 3, 6, 7}, {1, 2, 3, 7, 8}, {1, 2, 3, 8, 9}, {2, 3, 4, 6, 7}, {2, 3, 4, 8, 9}, {1, 2, 6, 7, 8}, {1, 2, 7, 8, 9}, {2, 3, 6, 7, 8}, {2, 3, 7, 8, 9}, {3, 4, 6, 7, 8}, or {3, 4, 7, 8, 9} index. Alternatively, the former three symbols of the subframe may be used as DL for the transmission of an SCH although a subframe having the index 1 or 6 switches to an UL subframe and is used. In this case, a guard period may be placed at the boundary of a DL symbol and UL symbol in the corresponding subframe.

Although an UL subframe has been configured according to a new configuration proposed in this specification as described above, both UE and an eNodeB may be assumed to be a DL subframe if the UL subframe is a subframe in which a discovery signal or major cell-specific DL information has been configured.

Meanwhile, in a next-generation system, a Carrier Aggregation (CA) type may be different in the physical location of the eNodeB 200 corresponding to each cell, which may be named an inter-site CA. In this situation, a Timing Advance (TA) to be applied when UL for each cell is transmitted may be different. In particular, if the frequency of a carrier for the UL of each cell is the same or present in the same band, a collision between the UL channels of a plurality of subframes may become problematic. Such a situation may occur when UE uses a plurality of UL channels using the same RF unit. Such a problem is not limited to TDD and may be problematic even in the case of FDD. In order to solve such a problem, a shortened CP may be applied, and a guard period may be placed between UL subframes. Whether or not to apply a shortened CP to the UL subframe (1) may be en block applied in the case of an inter-site CA, (2) may be determined through a high layer, and (3) may be determined by determining whether or not to apply a shortened CP as an additional information type within channels accompanied by an UL grant. If a first CP is an extended CP, a normal CP may be selected as an additional second CP in addition to a shortened CP. The following is an example of a method of applying a shortened CP to a transmission environment for different UL cells.

In a first scheme, if a shortened CP is applied to an UL subframe, the length of a CP corresponding to all OFDM symbols within the corresponding subframe may be a shortened type, and secured redundant duration (or samples) may be used to generate guard periods at the start and end portions of each subframe.

In a second scheme, if a shortened CP is applied to an UL subframe, a shortened CP is applied only when two UL channels collide against each other in the corresponding subframe. In this case, each eNodeB 200 may perform blind decoding on a first CP and a second CP. The shortened CP may be applied to OFDM symbols within the second slot of a subframe that belongs to subframes between which a collision may occur and that is placed ahead and may be applied to OFDM symbols within the first slot of a next subframe. In such a case, a guard period may be represented in a type, such as FIG. 17f. In this case, a DL subframe may be interpreted as an UL subframe.

Meanwhile, a signal related to the application of a shortened CP to the transmission of an UL channel and a signal related to the application of a shortened CP for distinguishing DL/UL channels may be independently configured. The securing of a guard period through symbol puncturing in addition to the securing of a guard period through a shortened CP may also be extended from the present invention.

Figure 18A:
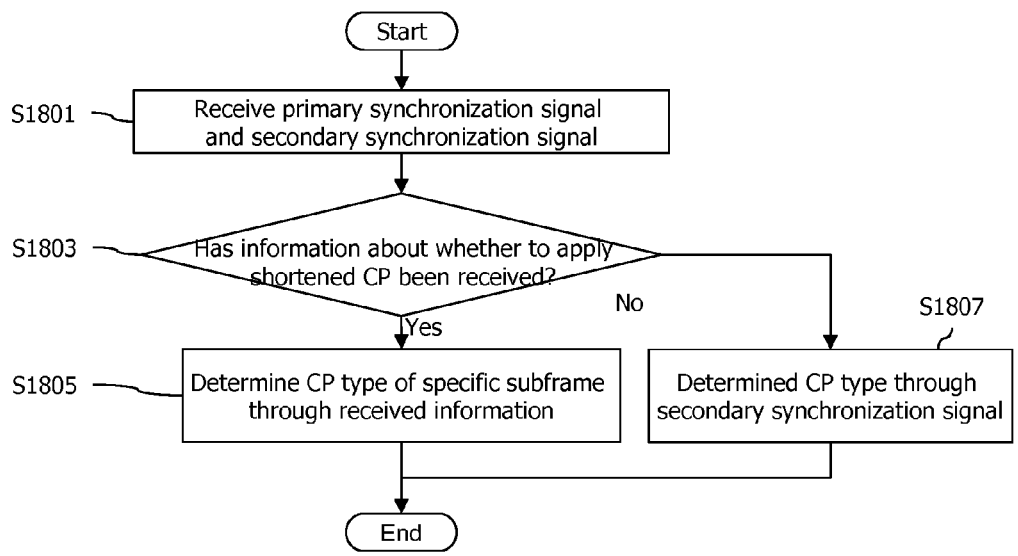
FIGS. 18a and 18b illustrate the flows of procedures when a shortened CP is used in accordance with a first embodiment of this specification.
Figure 18B:
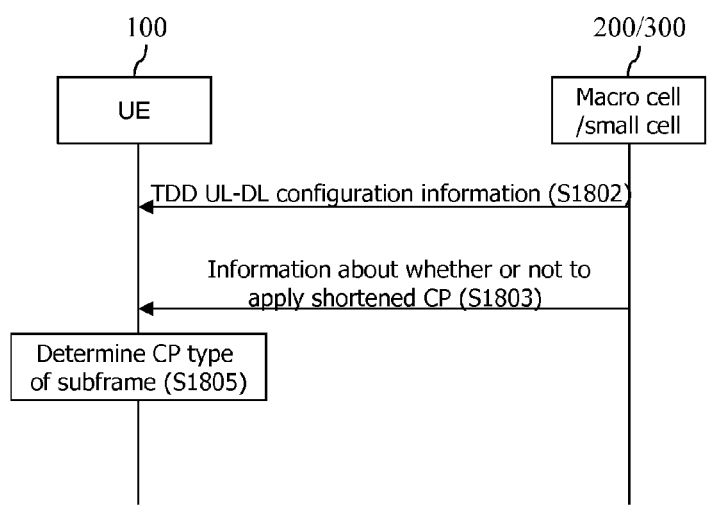

FIGS. 18a and 18b illustrate the flows of procedures when a shortened CP is used in accordance with a first embodiment of this specification.

As may be seen with reference to FIG. 18a, the UE 100 receives a Primary Synchronization Signal (PSS) and a Secondary Synchronization Signal (SSS) from the macro cell/small cell 200/300 (S1801).

Next, the UE 100 additionally receives information about whether or not to apply a shortened CP (S1803). In this case, if the information indicates whether or not to apply the shortened CP to each subframe/slot, the UE 100 may determine a CP type applied to a specific subframe/slot through the information (S1805). Additionally, the UE 100 may determine the type of Cyclic Prefix (CP) applied to another subframe/slot through a secondary synchronization signal.

However, if the information is not received, the UE 100 determines a CP type through the secondary synchronization signal (S1807).

Meanwhile, as may be seen with reference to FIG. 18b, the UE 100 receives the TDD DL-UL configuration illustrated in Table 1 from the macro cell/small cell 200/300 (S1802). Next, the UE 100 receives information about whether or not to apply the shortened CP from the macro cell/small cell 200/300 (S1803). The information may indicate whether or not to apply the shortened CP to each subframe/slot. If whether or not to apply the shortened CP is indicated for each subframe/slot, the information may be a bitmap type.

Accordingly, the UE 100 may determine a CP type applied to a subframe or slot based on the information (S1805). That is, the UE 100 may determine whether or not to apply a shortened CP to a DL subframe and an UL subframe. More specifically, if there is switching between a DL subframe and an UL subframe, the UE 100 may determine that the shortened CP is applied. The examples for this have been described above with reference to FIGS. 17a~17g.

Figure 19A:
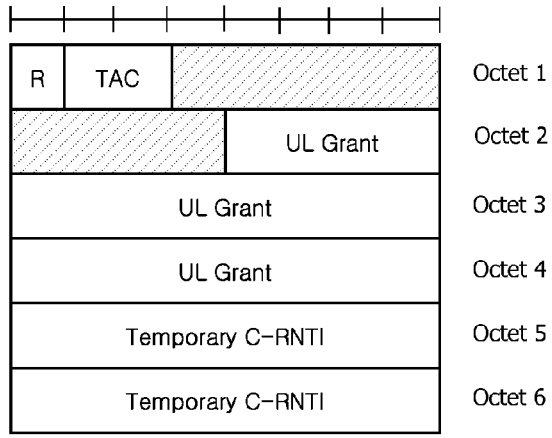
FIGS. 19a to 19c are exemplary diagrams illustrating the structure of a MAC Random Access Response (RAR) in which the length of a Timing Advance Command (TAC) has been reduced in accordance with a second embodiment of this specification.
Figure 19B:
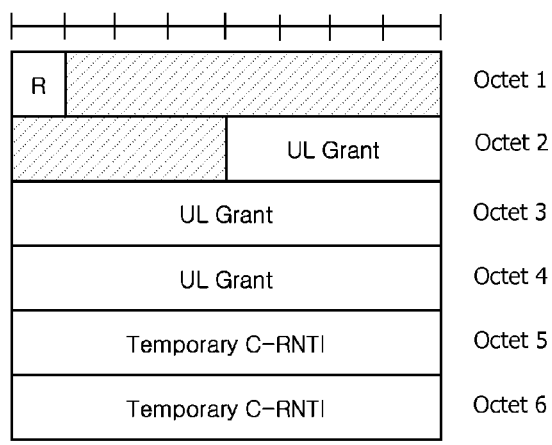
Figure 19C:
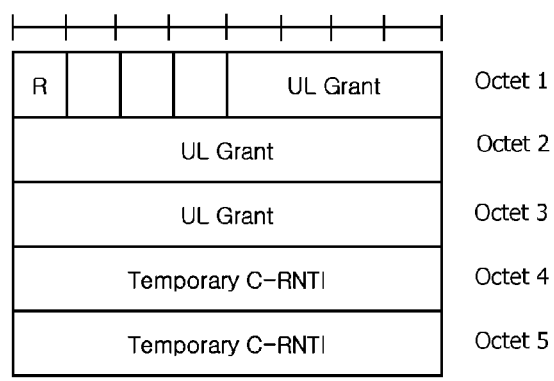

FIGS. 19a to 19c are exemplary diagrams illustrating the structure of a MAC Random Access Response (RAR) in which the length of a Timing Advance Command (TAC) has been reduced in accordance with a second embodiment of this specification.

As described above, each piece of UE 100 receives a Timing Advance Command (TAC) from the eNodeB 200 based on an existing 3GPP LTE release-10 system and performs a process of performing uplink synchronization.

If short-distance communication or communication (e.g., D2D) between pieces of UE is performed based on small cells as described above, propagation delay attributable to a Round Trip Distance (RTD) may be said to be a negligible level. In this case, the length of a Timing Advance Command (TAC), that is, a target, may be set to be relatively small or to be 0 compared to communication based on a macro cell. Accordingly, as illustrated in FIG. 12d, in a MAC Random Access Response (RAR), the number of bits of a Timing Advance Command (TAC) may be a waste of resources.

Accordingly, as illustrated in FIG. 19a, the length of bits of a Timing Advance Command (TAC) can be reduced compared to FIG. 12d. Bits (indicated by slashes) secured by reducing the length of bits of the Timing Advance Command (TAC) as described above may be used to represent another information. For example, the number of bits secured by reducing the number of bits of a Timing Advance Command (TAC) may be used for an UL grant. As described above, an increase in the number of bits of the UL grant can avoid a situation in which some information is truncated when resources for MSG3 are allocated and an MCS is configured in an existing release-10 system.

Alternatively, as illustrated in FIGS. 19b and 19c, a Timing Advance Command (TAC) may not be transmitted. In a next-generation system, a specific cell/cell group may notify the UE 100 whether or not to send a Timing Advance Command (TAC) through a high layer signal. The high layer signal may be transmitted in a UE-specific way or may be transmitted in a cell-specific way. If the high layer signal is transmitted in a cell-specific way, it may be useful compared to a case where a corresponding cell/cell group is a small cell. The small cell means a small cell having a relatively small cell coverage radius compared to a macro cell.

If a Timing Advance Command (TAC) corresponding to initial access has been configured to be not transmitted through a high layer signal as described above, as illustrated in FIG. 19b, 11 bits (indicated by slashes) used as a Timing Advance Command (TAC) may be used to represent other information. Other information may be information about an eNodeB, for example. The information about the eNodeB may be the type of global cell ID and may be represented as an eNodeB ID.

Alternatively, if a Timing Advance Command (TAC) corresponding to initial access has been configured to be not transmitted through a high layer signal, as illustrated in FIG. 19c, the size of an RAR may be reduced compared to FIG. 12d.

An example in which bits secured by reducing or obviating the number of bits of a Timing Advance Command (TAC) are used to represent other information is described in more detail below.

In a first example, the additionally secured bits are used to extend UL grant information. That is, resource block allocation information about a PUSCH within the UL grant is set as an UL bandwidth parameter. A method of setting the resource block allocation information as the UL bandwidth parameter may include using the number of UL Resource Blocks (RBs). The sum of the number of bits of the resource block allocation information and hopping resource allocation may be represent using the following equation.

$$\lceil \log_2(N_{RB}^{UL}(N_{RB}^{UL}+1)/2) \rceil \qquad \text{[Equation 1]}$$

Furthermore, the number of bits within UL grant information about an MCS may be extended to 5 bits using the additionally secured bits. In a MAC Random Access Response (RAR) corresponding to a random access grant, the remaining field may be left as a reserved field for future use.

In a second example, the additionally secured bits are used to extend UL grant information, but resource block allocation information about a PUSCH within the UL grant is set based on an UL bandwidth and 10 bits. As described above, a method of setting the resource block allocation information as the UL bandwidth parameter may include using the number of UL Resource Blocks (RBs). The sum of the number of bits of the resource block allocation information and hopping resource allocation information may be 10 bits in the case of $N_{RB}^{UL} \leq 44$ and may be bits according to Equation 1 in the remaining cases. Furthermore, the number of bits of the MCS may be extended to 5 bits. In a MAC Random Access Response (RAR) corresponding to a random access grant, the remaining fields may be left as a reserved field for future use.

In a third example, the additionally secured bits are used to represent information about the ID of an eNodeB. Cells performing a Carrier Aggregation (CA) may use the ID information to determine whether it is an inter-site type or intra-site type.

In the above methods, if the additionally secured region of an MAC RAR is used to extend an UL grant for Msg3, Msg3 can be managed and operated more efficiently using both resource allocation and MCS information without truncating the resource allocation and MCS information.

The embodiments of the present invention described so far may be implemented through a variety of means. For example, the embodiments of the present invention may be implemented by hardware, firmware, software, or a combination of them. More specifically, this is described with reference to the figure.

Figure 20:
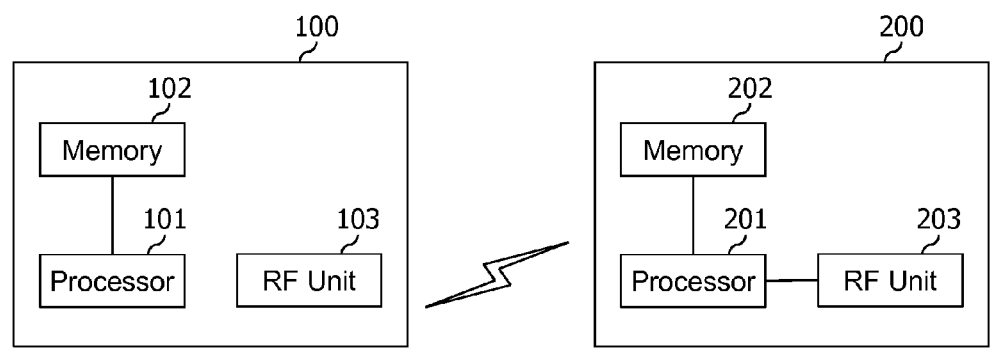
FIG. 20 is a block diagram illustrating a wireless communication system in which an embodiment of the present invention is implemented.

FIG. 20 is a block diagram illustrating a wireless communication system in which an embodiment of the present invention is implemented.

The macro eNodeB 200 includes a processor 201, memory 202, and a Radio Frequency (RF) unit 203. The memory 202 is connected to the processor 201, and stores a variety of pieces of information for driving the processor 201. The RF unit 203 is connected to the processor 201, and sends and/or receives radio signals. The processor 201 implements the proposed functions, processes and/or methods. In the aforementioned embodiments, the operation of the eNodeB may be implemented by the processor 201.

The UE 100 includes a processor 101, memory 102, and an RF unit 103. The memory 102 is connected to the processor 101, and stores a variety of pieces of information for driving the processor 101. The RF unit 103 is connected to the processor 101, and sends and/or receives radio signals. The processor 101 implements the proposed functions, processes and/or methods. In the aforementioned embodiments, the operation of the eNodeB may be implemented by the processor 101.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A Time Division Duplex (TDD) transmission and reception method performed by a user equipment (UE) and comprising:
   receiving first information from a cell, the first information is related to a downlink (DL)-uplink (UL) subframe configuration according to TDD and including a secondary synchronization signal (SSS);
   determining whether second information is received from the cell, the second information is related to a third Cyclic Prefix (CP) whose length is shorter than a length of a first CP and a length of a second CP;
   applying the third CP to each of a downlink subframe and an uplink subframe based on the second information when the second information is received;
   transmitting a random access preamble on the uplink subframe using the third CP; and
   receiving a random access response on the downlink subframe using the third CP,
   wherein the UE determines whether to apply the third CP to each of the downlink subframe and the uplink subframe based on the SSS when the second information is not received.

2. The method of claim 1, further comprising applying the third CP to subframes on both sides of a time point of switching between the downlink subframe and the uplink subframe.

3. The method of claim 1, further comprising applying the third CP to any one subframe if there is switching between the downlink subframe and the uplink subframe.

4. The method of claim 3, wherein applying the third CP comprises applying the third CP to the downlink subframe or applying the third CP to the uplink subframe placed subsequent to the downlink subframe if the uplink subframe is placed subsequent to the downlink subframe.

5. The method of claim 3, wherein applying the third CP comprises applying the third CP to the uplink subframe or applying the third CP to the downlink subframe placed subsequent to the uplink subframe if the downlink subframe is placed subsequent to the uplink subframe.

6. The method of claim 1, further comprising placing a guard period in at least a start portion or end portion of a corresponding subframe.

7. The method of claim 1, wherein a length of a timing advance command (TAC) is shorter than 11 bits within a MAC Protocol Data Unit (PDU) comprising the random access response.

8. The method of claim 7, wherein bits secured by shortening the length of the TAC are used for an UL grant and information for cell identification.

9. A user equipment (UE), comprising:
   a Radio Frequency (RF) unit configured to receive first information from a cell, the first information is related to a downlink (DL)-uplink (UL) subframe configuration according to Time Division Duplex (TDD) and including a primary synchronization signal (PSS) and a secondary synchronization signal (SSS); and
   a processor configured to:
   determine whether second information is received from the cell, the second information is related to a third Cyclic Prefix (CP) whose length is shorter than a length of a first CP and a length of a second CP; and apply the third CP to each of a downlink subframe and an uplink subframe based on the second information when the second information is received, wherein the RF unit further configured to transmit a random access preamble on the uplink subframe using the third CP and to receive a random access response on the downlink subframe using the third CP, and wherein the processor is further configured to determine whether to apply the third CP to each of the downlink subframe and the uplink subframe based on the SSS when the second information is not received.

10. The UE of claim 9, wherein the processor is further configured to apply the third CP to subframes on both sides of a time point of switching between the downlink subframe and the uplink subframe.

11. The UE of claim 9, wherein the processor is further configured to apply the third CP to any one subframe if there is switching between the downlink subframe and the uplink subframe.

12. The UE of claim 11, wherein the processor is further configured to apply the third CP to the downlink subframe or determine to apply the third CP to the uplink subframe placed subsequent to the downlink subframe if the uplink subframe is placed subsequent to the downlink subframe.

13. The UE of claim 11, wherein the processor is further configured to apply the third CP to the uplink subframe or apply the third CP to the downlink subframe placed subsequent to the uplink subframe if the downlink subframe is placed subsequent to the uplink subframe.

14. The UE of claim 9, wherein the processor is further configured to place a guard period in at least a start portion or end portion of a corresponding subframe.

15. The UE of claim 9, wherein a length of a timing advance command (TAC) is shorter than 11 bits within a MAC Protocol Data Unit (PDU) comprising the random access response.

16. The UE of claim 15, wherein bits secured by shortening the length of the TAC are used for an UL grant and information for cell identification.

* * * * *